UNITED STATES PATENT OFFICE.

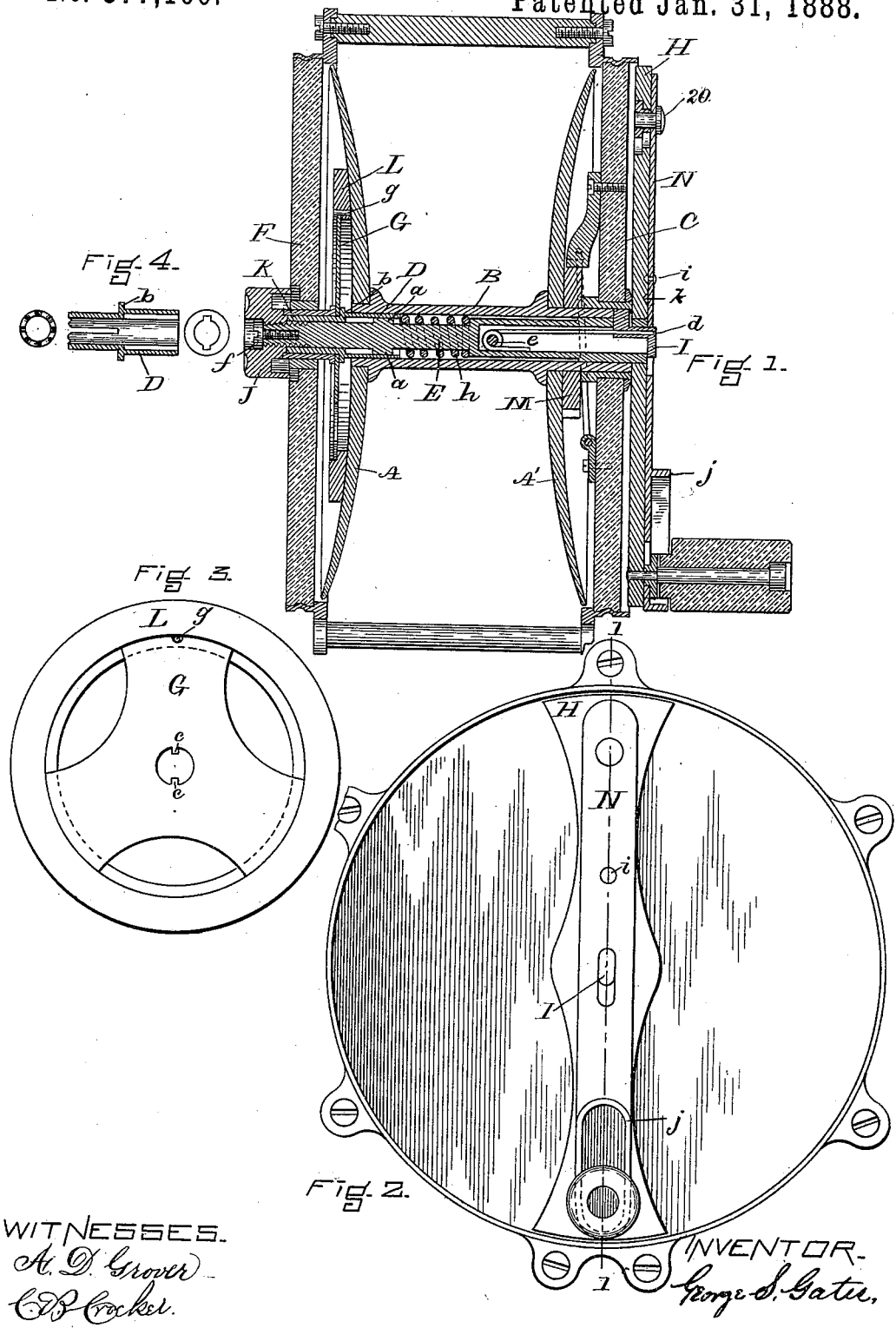

GEORGE S. GATES, OF ATHOL, MASSACHUSETTS.

FISHING-REEL.

SPECIFICATION forming part of Letters Patent No. 377,100, dated January 31, 1888.

Application filed July 8, 1887. Serial No. 243,798. (Model.)

*To all whom it may concern:*

Be it known that I, GEORGE S. GATES, of Athol, county of Worcester, and State of Massachusetts, have invented an Improvement in Fishing-Reels, of which the following description, in connection with the accompanying drawings, is a specification, like letters on the drawings representing like parts.

The use of a reel enables a person, when a large fish is hooked, to worry the fish by a slight pull on the line into making such frantic struggle to disengage itself that it will become exhausted by its own efforts and be easily drawn within reach of the gaff or landing net. To successfully accomplish this requires skill on the part of the fisherman to prevent the fish at any time from getting a pull on the hook sufficient for tearing away or breaking the hook or line.

Various devices have been employed for regulating the tension on the line when the fish is running away from the reel and necessarily drawing the line from the same. After the fish has made such a run, turns, and comes toward the reel, the slack line must be recovered before a strain is brought on the fish. This may be accomplished by a coiled spring attached to the spool, but is usually done by turning the handle of the reel by hand. When the line is being drawn from the reel, the handle must be dropped, as it revolves with the spool. When the line is being wound in, should the fish make a sudden rush away from the reel, there is liability of a jerk on the hook and the fish escaping through retaining a hold on the handle. With inexperienced persons there is constant danger when manipulating the handle of the reel of exceeding the proper strain to put on the line or pull to which the fish should be subjected. Heretofore in all single-acting reels—that is, where the spool makes the same number of revolutions as the handle—the latter has been directly connected with the spool. In accordance with this invention the hub of the spool is bored to receive a shaft to which is fixed a spring bearing upon a flange of the spool, thereby producing a friction tension-reel whose action depends upon the strain that is given to the line.

The object of my invention is to automatically control the strain on the line when a fish is hooked, and is of the nature of a frictional mechanism or device which limits the strain that can be given to the line by turning the handle of the reel.

The effect of this device is to offer a resistance to the motion of the spool when the handle of the reel is held stationary, or it becomes a force to revolve the spool when the handle is turned. Consequently, when the strain on the line exceeds the frictional resistance of the mechanism, the spool will revolve in the opposite direction to that of the handle and the line will be drawn out; but when the strain on the line is less than such frictional resistance the spool will take the direction of the handle and the line will be wound in. The frictional force to revolve the spool is always sufficient to draw the line, when free, through the water, and is provided with suitable adjusting devices.

A ring of hard rubber or similar material is preferably interposed between the friction-spring and spool to obviate the cutting or rapid wearing of the metal should the bearing-surface become dry. The shaft is provided with a locking device which is adapted to engage and disengage the spool. The means herein employed for moving the locking device consist of a slotted strip mounted on or adjacent to the handle and adapted to be moved by hand. The strip is provided with a collar or lug at the base of the thumb-piece or knob of the handle, which enables it to be operated by the thumb or finger of the hand while holding the handle of the reel. By means of this device a person may continue to turn the handle of the reel in the direction to wind in the line, although the fish may be running away from the reel and drawing out the line. This insures instant recovery of the line whenever slack is given by the actions of the fish, and prevents any possibility of a dead pull on the hook. The action of the reel when locked is exactly the same as the ordinary non-multiplying kind.

Figure 1 is a section through center of reel on line 1 1, Fig. 2. Fig. 2 is an end elevation of reel. Fig. 3 is a plan of tension-spring and friction-ring, and Fig. 4 a section of sleeve for driving tension-spring and friction-ring.

The flanges or disks A A' are secured to the hollow hub B, one end of which is extended and has a bearing in the bushing in the face of the reel C. The end C has one or more slots to receive the locking-piece of the shaft. The opposite end of the hub is supported by the sleeve D upon the shaft E, which extends through and has a bearing in the bushing in the face of the reel F. The sleeve D, Fig. 4, is grooved longitudinally for a portion of its length to receive projections $a$ $a$ of the shaft E, and the outer end is ridged to the rib $b$, to enter the slots $c$ $c$, Fig. 3, of a tension spring or plate, G. The outer end of the sleeve D is radially corrugated or roughened. The shaft E is riveted to the handle H and bored for a portion of its length to receive the spring $d$ of a locking-piece, I. The spring $d$ is held by the pin $e$, passing through the shaft and coil of the wire.

A tension or adjusting nut, J, is screwed upon the end of the shaft E, and is prevented from being accidentally removed by a screw, $f$, screwed into the end of the shaft. The nut J is counterbored to form a flange, and the face of the reel F is recessed to receive the flange to prevent the line from being caught between the nut and the face of the reel. By turning the nut J the sleeve K compresses the spring G, and the friction-ring L will be held against the flange A with a force proportional to the tension of the spring or plate G. The thrust of the spool caused by the tension-spring G is received by the click-wheel M, mounted upon the hub B against the bushing in the reel-face C. A friction-ring, L, is placed adjacent to the disk or flange A, inclosing the tension-spring G, and is provided with a stud, $g$, which acts as a key to join the tension-plate and ring, so that when the spring G is revolved the ring L revolves with it. A spiral spring, $h$, surrounds the shaft E and causes the corrugations on the end of the sleeve D to engage with similar corrugations on the nut J. These corrugations form a friction-surface, preventing the nut J from turning too easily. The sliding spring-strip N is provided at one end with a stud, 20, which enters a slot cut in the handle H, and at the other end with a slot through which passes the knob of the handle H, so that said strip may be moved in the direction of the length of the handle H. The strip N is held in extreme positions by the rivet-head $i$ engaging with recesses in the handle H. The strip N is provided with an opening which receives the device I, and also with a collar or stud, $j$, for moving the strip to move the locking device, overcoming the resistance offered by the rivet-head $i$. The force of the spring $d$ is not sufficient to move the strip N. The friction-ring L, tension spring G, sleeve D, locking-piece I, and adjusting-nut J have the common motion of the shaft E when turned by the handle of the reel. When the rivet-head $i$ of the piece N falls in the recess $k$ of the handle H, the locking-piece I will be held in a position to allow the spool to revolve with the handle by the friction of the ring L, or in the opposite direction if the strain on the line exceeds the force of the friction.

The operation of the reel is as follows: The line is wound upon the hub B, between the flanges A A', by the friction exerted upon the flange A by the spring G, the latter being fast to the sleeve D, as described, after the tension-nut J has been adjusted, the locking device being in the position shown in Fig. 1. In that position the hub B can only turn when the handle H is turned, the outer end of the spring G forcing the key-piece of the locking device I into a slot in the hollow portion of the shaft E, thus locking the handle H to the shaft E. When the line has been wound, the nut J, turned to press the spring G against the plate L, causes them to rotate with the hub B and flanges A A'. As soon as a fish is hooked, the spring-piece N is moved in the direction of the length of the handle until the rivet-head $i$ enters the recess $k$ in the handle. In that position the key-piece of the locking device I is withdrawn from the slot in the shaft E and allows the said shaft to revolve in the direction opposite to that taken by the handle when the strain on the line exerted by the fish is greater than the friction caused by the spring $d$. When the fish offers no further resistance, it may be reeled in by turning the handle in the proper direction, the friction between the end of the shaft E and the piece I of the locking device being sufficient to rotate the shaft and its attached hub B.

I do not desire to limit my invention to the precise construction of friction device or locking device herein shown, as it is obvious that the same may be materially changed without departing from the spirit and scope of my invention.

I claim—

1. In a fishing-reel, a spool, a shaft upon which it is loosely mounted, and means for rotating the shaft, combined with a friction device adjustably connecting the shaft and spool, whereby the spool may be revolved in one direction and be permitted to revolve in the opposite direction when the strain on the line overcomes the friction of the said device, substantially as described.

2. In a fishing-reel, a spool, a shaft upon which it is loosely mounted, and means, substantially as described, for rotating the shaft, combined with a positive locking device within the shaft for locking the spool to the said shaft, and means operable adjacent to the means employed for rotating the shaft for moving said locking device, substantially as described.

3. In a fishing-reel, a spool, a shaft upon which it is loosely mounted, and means for rotating the shaft, combined with a friction device adjustably connecting the shaft and spool, said friction device comprising a tension spring or plate and a friction-ring inclosing it, substantially as described.

4. In a fishing-reel, a spool, a shaft upon which it is loosely mounted, and means, substantially as described, for rotating the shaft, combined with a positive locking device for locking the spool to the shaft, and a sliding strip mounted upon the handle, it having a projection adjacent to the knob of the handle, substantially as described.

5. In a fishing-reel, a spool, a shaft upon which it is loosely mounted, and means, substantially as described, for rotating the shaft, combined with a positive locking device for locking the spool to the shaft, and a sliding strip mounted upon the handle, it having a projection adjacent to the knob of the handle, and the rivet-head $i$, to enter recesses in the handle, substantially as described.

6. In a fishing-reel, a spool, a shaft upon which it is loosely mounted, a spring-controlled friction device adjustably connecting the shaft and spool, and adjusting devices therefor, combined with a positive locking device extending within the shaft, and means readily accessible to the operator for moving said locking device, substantially as described.

In testimony whereof I have signed my name to this specification in the presence of two subscribing witnesses.

GEORGE S. GATES.

Witnesses:
BERNICE J. NOYES,
C. M. CONE.